(12) United States Patent
Nakagama et al.

(10) Patent No.: US 8,159,717 B2
(45) Date of Patent: Apr. 17, 2012

(54) IMAGE PROCESSING APPARATUS

(75) Inventors: Kiyohari Nakagama, Fujisawa (JP);
Kouichi Hanada, Yokohama (JP);
Toyotsugu Sawaki, Toyohashi (JP);
Hiroji Ito, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 156 days.

(21) Appl. No.: 11/489,128

(22) Filed: Jul. 19, 2006

(65) Prior Publication Data
US 2007/0188810 A1 Aug. 16, 2007

(30) Foreign Application Priority Data
Feb. 13, 2006 (JP) .................................. 2006-035386

(51) Int. Cl.
*G06K 15/00* (2006.01)
*H04N 1/46* (2006.01)

(52) U.S. Cl. ......... 358/2.1; 358/1.9; 358/1.18; 358/527; 358/537; 358/540; 382/100; 382/112; 382/151

(58) Field of Classification Search .................... 358/2.1, 358/1.9, 3.26–3.29, 474, 504; 382/112, 176, 382/100, 151
See application file for complete search history.

(56) References Cited

U.S. PATENT DOCUMENTS

| | | | | |
|---|---|---|---|---|
| 4,774,546 A | * | 9/1988 | Corona et al. | 399/2 |
| 4,884,106 A | * | 11/1989 | Harris | 399/178 |
| 5,065,185 A | * | 11/1991 | Powers et al. | 399/47 |
| 5,214,755 A | | 5/1993 | Mason | |
| 5,303,342 A | * | 4/1994 | Edge | 358/1.1 |
| 5,325,449 A | * | 6/1994 | Burt et al. | 382/240 |
| 5,479,597 A | * | 12/1995 | Fellous | 715/201 |
| 5,646,744 A | * | 7/1997 | Knox | 358/401 |
| 5,832,140 A | * | 11/1998 | Stapleton et al. | 382/298 |
| 5,878,321 A | * | 3/1999 | Miyazaki et al. | 399/388 |
| 6,064,399 A | * | 5/2000 | Teo | 345/629 |
| 6,115,509 A | * | 9/2000 | Yeskel | 382/309 |
| 6,404,915 B1 | * | 6/2002 | Yung et al. | 382/162 |

(Continued)

FOREIGN PATENT DOCUMENTS

JP     7-111583 A     4/1995

(Continued)

OTHER PUBLICATIONS

Related U.S. Appl. No. 11/489,127, filed Jul. 19, 2006; Inventor: Kiyohari Nakagama et al.

*Primary Examiner* — King Poon
*Assistant Examiner* — Richard Zhu
(74) *Attorney, Agent, or Firm* — Holtz, Holtz, Goodman & Chick, PC (57) ABSTRACT

Combining section 21 creates the composite image data by combining the image data of the original image and the additional image, and log management section 22 stores the condition of composite images at the time of image combining as log information 40. Printer section 18 prints the composite image based on the composite image data, and a scanner section 16 optically reads the printed composite image. Judgment section 23 judges the condition of adding the additional image in the composite image (presence or absence of overlapping, etc.,) based on stored log information 40 and on the image data obtained by reading out the composite image, and notification control section 24 notifies the user of the judgment result either by displaying or by printing out.

8 Claims, 10 Drawing Sheets

40a

| STAMP TYPE | TYPE A | | | | |
|---|---|---|---|---|---|
| | PAGE | COMBINING POSITION | STAMP | PRINT NUMBER | PRINT TIME |
| COMBINING INFORMATION FOR EACH PAGE | P1 | BOTTOM RIGHT | PRESENT | A11-1B-0001 | 9:20:15 |
| | P2 | BOTTOM RIGHT | PRESENT | A11-1B-0002 | 9:20:17 |
| | P3 | TOP RIGHT | PRESENT | A11-1B-0003 | 9:20:19 |
| | P4 | BOTTOM LEFT | PRESENT | A11-1B-0004 | 9:20:22 |
| | P5 | TOP LEFT | NOT PRESENT | A11-1B-0005 | 9:20:28 |

40b

| STAMP TYPE | TYPE A | | | | |
|---|---|---|---|---|---|
| | PAGE | COMBINING POSITION | STAMP | PRINT NUMBER | PRINT TIME |
| COMBINING INFORMATION FOR EACH PAGE | P1 | BOTTOM RIGHT | PRESENT | A11-1B-0001 | 9:20:15 |
| | P2 | BOTTOM RIGHT | PRESENT | A11-1B-0002 | 9:20:17 |
| | P3 | BOTTOM RIGHT | PRESENT | A11-1B-0003 | 9:20:19 |
| | P4 | BOTTOM RIGHT | PRESENT | A11-1B-0004 | 9:20:22 |
| | P5 | BOTTOM RIGHT | NOT PRESENT | A11-1B-0005 | 9:20:28 |

U.S. PATENT DOCUMENTS

| | | | |
|---|---|---|---|
| 6,516,170 B2 * | 2/2003 | Tsukamoto et al. | 399/182 |
| 6,704,456 B1 * | 3/2004 | Venable | 382/266 |
| 6,738,154 B1 * | 5/2004 | Venable | 358/1.15 |
| 6,760,638 B1 * | 7/2004 | Love et al. | 700/98 |
| 6,771,396 B1 * | 8/2004 | Cheatle et al. | 358/474 |
| 6,839,466 B2 * | 1/2005 | Venable | 382/199 |
| 6,895,106 B2 * | 5/2005 | Wang et al. | 382/132 |
| 6,977,754 B2 * | 12/2005 | Matsumoto et al. | 358/1.9 |
| 6,990,255 B2 * | 1/2006 | Romanik et al. | 382/284 |
| 7,046,404 B2 * | 5/2006 | Cheatle et al. | 358/450 |
| 7,281,209 B2 | 10/2007 | Nara et al. | |
| 7,292,375 B2 * | 11/2007 | Nishida | 358/3.26 |
| 7,362,471 B2 * | 4/2008 | Date | 358/2.1 |
| 7,433,098 B2 * | 10/2008 | Klein et al. | 358/505 |
| 7,523,864 B2 | 4/2009 | Manheim | |
| 2003/0056174 A1 | 3/2003 | Nara et al. | |
| 2004/0124242 A1 | 7/2004 | Critelli et al. | |
| 2005/0196070 A1 * | 9/2005 | Takakura et al. | 382/284 |
| 2006/0022050 A1 | 2/2006 | Critelli et al. | |
| 2006/0050961 A1 * | 3/2006 | Thiyagarajah | 382/181 |
| 2006/0279814 A1 * | 12/2006 | Fukada et al. | 358/540 |
| 2007/0188805 A1 | 8/2007 | Nakagama et al. | |

FOREIGN PATENT DOCUMENTS

| | | |
|---|---|---|
| JP | 09-086015 A | 3/1997 |
| JP | 09-247425 A | 9/1997 |
| JP | 2000-209433 A | 7/2000 |
| JP | 2000-324332 A | 11/2000 |
| JP | 2001-197292 A | 7/2001 |
| JP | 2003-110842 A | 4/2003 |
| JP | 2003-127474 A | 5/2003 |
| JP | 2003-134324 A | 5/2003 |
| JP | 2003-330692 A | 11/2003 |
| JP | 2005-286934 A | 10/2005 |
| JP | 2005-303851 A | 10/2005 |
| JP | 2006-033260 A | 2/2006 |
| JP | 2006-041802 A | 2/2006 |

* cited by examiner

FIRST SET
(FOR A COURT)

SECOND SET
(FOR A PATENT
ATTORNEY OFFICE)

THIRD SET
(FOR A CLIENT)

| STAMP TYPE | TYPE A | | | | |
|---|---|---|---|---|---|
| COMBINING INFORMATION FOR EACH PAGE | PAGE | COMBINING POSITION | STAMP | PRINT NUMBER | PRINT TIME |
| | P1 | BOTTOM RIGHT | PRESENT | A11-1B-0001 | 9:20:15 |
| | P2 | BOTTOM RIGHT | PRESENT | A11-1B-0002 | 9:20:17 |
| | P3 | TOP RIGHT | PRESENT | A11-1B-0003 | 9:20:19 |
| | P4 | BOTTOM LEFT | PRESENT | A11-1B-0004 | 9:20:22 |
| | P5 | TOP LEFT | NOT PRESENT | A11-1B-0005 | 9:20:28 |

| STAMP TYPE | TYPE A | | | | |
|---|---|---|---|---|---|
| COMBINING INFORMATION FOR EACH PAGE | PAGE | COMBINING POSITION | STAMP | PRINT NUMBER | PRINT TIME |
| | P1 | BOTTOM RIGHT | PRESENT | A11-1B-0001 | 9:20:15 |
| | P2 | BOTTOM RIGHT | PRESENT | A11-1B-0002 | 9:20:17 |
| | P3 | BOTTOM RIGHT | PRESENT | A11-1B-0003 | 9:20:19 |
| | P4 | BOTTOM RIGHT | PRESENT | A11-1B-0004 | 9:20:22 |
| | P5 | BOTTOM RIGHT | NOT PRESENT | A11-1B-0005 | 9:20:28 |

| STAMP TYPE | TYPE A | | |
|---|---|---|---|
| COMBINING INFORMATION FOR EACH PAGE | PAGE | COMBINING POSITION | STAMP |
| | P1 - P5 | BOTTOM RIGHT | P5 NOT PRESENT |
| | | | |
| | | | |
| | | | |

Konicaminolta
Mirage1234
'04/11/31

FIG. 6 (b)

Konicaminolta
Mirage1234
'04/11/31

FIG. 6 (c)

Konicaminolta
Mirage1234
'04/11/31

| PAGE | COMBINING POSITION | STAMP | CONDITION |
|---|---|---|---|
| P1 | BOTTOM RIGHT | PRESENT | A |
| P2 | BOTTOM RIGHT | PRESENT | A |
| P3 | TOP RIGHT | PRESENT | B |
| P4 | BOTTOM LEFT | PRESENT | C |
| P5 | TOP LEFT | NOT PRESENT | C |

FIG. 9 (b)

| PAGE | COMBINING POSITION | STAMP | CONDITION |
|---|---|---|---|
| P3 | TOP RIGHT | PRESENT | B |
| P4 | BOTTOM LEFT | PRESENT | C |
| P5 | TOP LEFT | NOT PRESENT | C |

FIG. 10

IMAGE PROCESSING APPARATUS

RELATED APPLICATION

This application is based on Japanese patent application Ser. No. JP2006-035386 filed on Feb. 13, 2006, in Japanese Patent Office, the entire content of which is hereby incorporated by reference.

BACKGROUND

1. Field of the Invention

The present invention relates to an image forming apparatus to combine an additional image with an original image and to output a composite image.

2. Description of the Related Art

When a document is copied or printed from a personal computer, there is available a printing apparatus which prints the document adding additional images such as the company's logo, "CONFIDENTIAL" or "COPYING PROHIBITED", to the document. The position of the adding additional images is usually specified by a user, and there is known technology that detects a width of margin at a designated position, and combines the images after changing or shifting the scale of the additional image so as to adjust it the width of margin (see, for example, Patent Document 1).

Patent Document 1: Japanese Unexamined Patent Application Open to Public Inspection No. Tokkaihei 7-111583

In the above technology, where the additional images are combined automatically, if the composite material where the additional image is combined is an important document, it is necessary to be verified visually the state of image particularly, the state of overlapping of the additional image and the original image again.

For example, in the offices of attorneys/law firms in the U.S.A., legal documents such as court documents are prepared in three sets, one set for submitting to a court, one set for retaining in the attorney's office/law firm, and one set for a client, and as proof of having prepared these three sets of documents, a stamp (called Bates Stamp) having a logo of the attorney's office/law firm, date, and page number is affixed manually in the blank part of each page so that it does not overlap with the original images. When combining these images automatically to reduce the labor of affixing the stamp, because of the importance of legal documents, the output image after combining the images has to be verified by visual inspection, however since the court documents run into a large number of pages, visual inspection work becomes very cumbersome.

The present invention is made in order to solve the above problem, and the object of the present invention is to provide an image forming apparatus that can reduce the burden of carrying out visual verification related to composite images created by adding additional images to the original image.

The above object of the present invention is achieved by the inventions in each of the following items.

SUMMARY

In view of foregoing, an object of this invention is to solve at least one of the problems, and to provide new image processing apparatus. The image processing apparatus comprises a composition section to create first composite image data by composing image data with additional image data; a storage section to store log information showing a combining condition used in creating the first composite image data; a printing section to print a composite image based on the composite image data; a scanning section to scan the composite image and obtain second composite image data; a judgment section to judge a condition of an additional image represented by the additional image data in the composite image based on the log information and the second composite image data; and a notification section to notify a judgment result by the judgment section.

According to another aspect of the present invention, the image processing apparatus comprises a scanning section to scan a composite image including an image and an additional image added to the image, and obtain composite image data; a judgment section to judge a condition of the additional image in the composite image based on log information showing a combining condition used in creating the composite image and the composite image data; and a notification section to notify a judgment result by the judgment section.

According to another aspect of the present invention, the image processing apparatus comprises an information obtaining section to obtain image data, additional image data added to the image data and log information showing a combining condition used in creating the composite image by combining the image data with the additional image data; a judgment section to judge a condition of the additional image represented by the additional image data in the composite image based on the image data, the additional image data and the log information; and a notification section to notify a judgment result by the judgment section.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

A preferred embodiment of the present invention is described in detail below with reference to the drawings.

Figure 1:
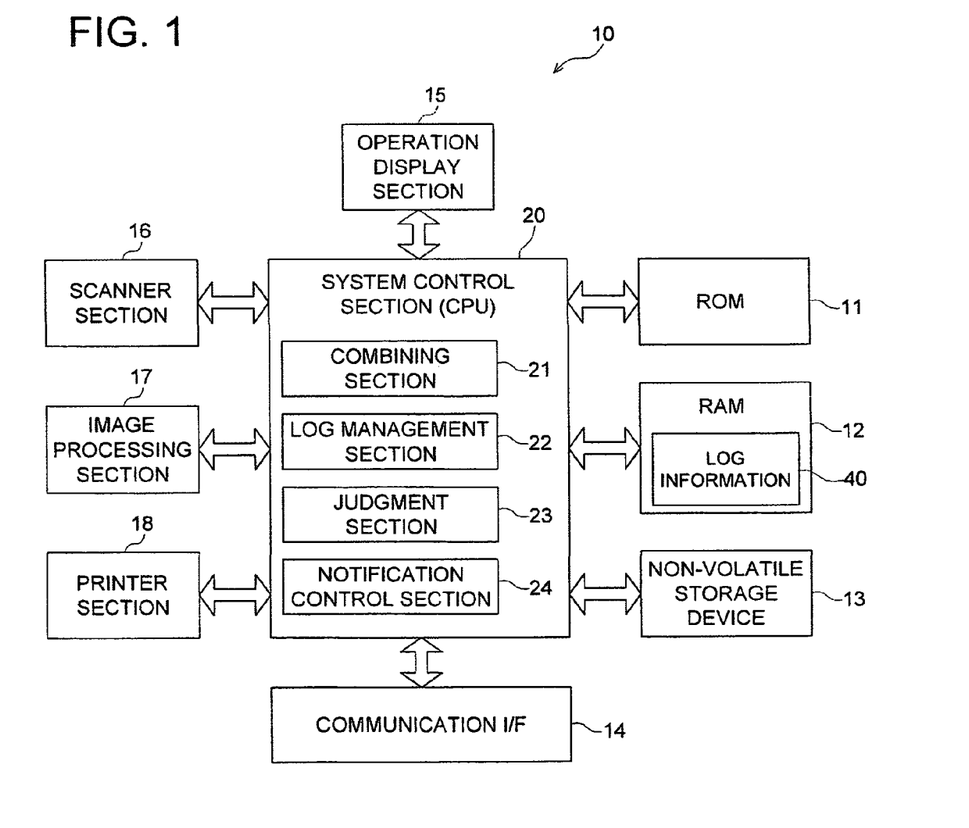
FIG. 1 is an explanatory diagram showing configuration of an image forming apparatus of a preferred embodiment of the present invention.

FIG. 1 shows an outline configuration of an image forming apparatus 10 of a preferred embodiment of the present invention. Image forming apparatus 10 is configured as a multi-function peripheral, in addition to a function of a copying machine that reads out the image from the original document and copies it on recording paper, it has a printer function of printing based on the print data received from an external terminal, a scanner function of reading out the image from the original document to store the corresponding image data and to output to an external device, a facsimile function of transmitting and receiving image data via communication lines, etc.

In addition, image forming apparatus 10 has a function of adding a specified additional image to the original image and outputting the composite image, and a function of reading out optically the printed out composite image and judging the condition of overlapping of the additional image and the original image to notify the result of that judgment to the user.

Image forming apparatus 10 to carry out functions thereof has system control section 20 whose main part is a CPU (Central Processing Unit), and system control section 20 configured to be connected to ROM (Read Only Memory) 11, RAM (Random Access Memory) 12, non-volatile storage device 13, communication I/F (Interface) 14, an operation and display section 15, a scanner section 16, image processing section 17, and printer section 18.

ROM 11 stores various types of programs and fixed data, and system control section 20 comprehensively controls the operations of image forming apparatus 10 by executing the programs stored in ROM 11. RAM 12 is memory that can be freely written into or read out and is used as the working storage when system control section 20 executes programs. Further, the RAM 12 is used for storing log information 40 that indicates the condition of composite images when the additional image is combined with the original image.

Non-volatile storage device 13 is configured using non-volatile semiconductor memories or a hard disk drive unit and is used for storing various types of registration data, and for storing large volumes of image data. The contents of additional images specified by the user are stored in the non-volatile storage device 13.

Scanner section 16 is a reading device that optically reads out images of the original document and outputs the corresponding image data. Scanner section 16 is configured using a line image sensor. The scanner section 16 is provided with an automatic document feeder unit that is not shown in drawing and a document is fed one by one successively from a plurality of pages document placed in a document tray to be read out. Scanner section 16, apart from functioning as an input device for the original image before the additional image is combined, functions also as a reading section that optically reads out the composite image after the additional image is combined with the original image.

Image processing section 17 has a function of carrying out various types of processes on the image data such as enlarging, reducing, rotating, compressing, decompressing, etc. Also, it carries out a process of reducing the additional image if necessary.

Printer section 18 has a function of a printing section that forms images on the recording sheets. Here, this section is configured as a laser printer using the electro-photographic process and having a recording sheet conveying apparatus, photoreceptor drums, charging units, laser units, developing units, transferring and separating units, cleaning units, and a fixing unit.

Communication interface 14 has a function of communicating with external terminals such as a personal computer via a network. For example, it receives print instructions of print data from an external terminal. The image data of the original image which is combined with the additional image can be inputted via communication interface 14.

Operation and display section 15 has a display section such as an LCD (Liquid Crystal Display) and an operation section. The operation section is configured using operation switches and a touch panel placed on the liquid crystal display screen. In operation display section 15, the notification screen indicating the result of judging the condition of the additional image, etc. are displayed apart from various types of operation screens, setting screens, screens indicating the operating status of image forming apparatus 10. Operation display section 15 carries out a function of receiving the registration settings related to the contents of the additional images, and a function of a notification condition setting means that sets the notification conditions when notifying the judgment result. It is possible to receive these settings from an external terminal via communication interface 14.

The system control section 20 performs functions of combining section 21, log management section 22, judgment section 23, and notification control section 24 relating to judgment of combining the additional images.

Combining section 21 carries out the process of creating the composite image data by combining the image data of the original image and the image data of the additional image. Log management section 22 carries out the control of storing the log information indicating the combining conditions in RAM 12 when the composite image data is created by the combining section 21.

Judgment section 23 has a function of judging the condition of the additional image in the composite image by analyzing the image data obtained by reading out the composite image using scanner section 16 based on the log information stored at the time of combining the images. Notification control section 24 carries out controls related to notifying the judgment result.

An example of combining a Bates Stamp as the additional image is explained below.

Figure 2:
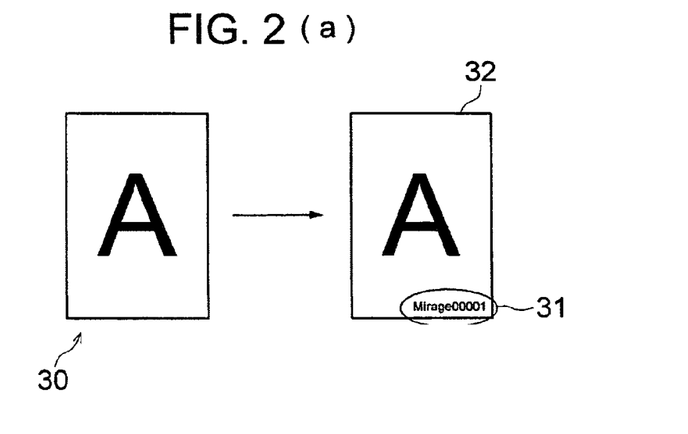
FIG. 2 is an explanatory diagram showing an example of a legal document where a Bates stamp is applied.

FIG. 2(a) shows original image 30 and composite image 32 in which Bates stamp 31 (hereinafter referred to merely as a stamp) is combined to the original image 30. In a attorney's offices/law firms in the United States of America, as shown in FIG. 2(b), legal documents such as court documents are prepared in three sets, one set for submitting to a court, one set for retaining in the attorney's office/law firm, and one set for a client. The image forming apparatus 10 combines the Bates stamp having a logo of the attorney's office/law firm, date, and page number with the original image by image processing and prints out the first document set D1, then reads out and copied the first document set D1 by scanner section 16 and then creates the second set D2 and the third set D3. Then, in the step of creating the second set D2 and the third set D3, the condition of affixing the Bates stamp is judged for each page whether or not it is satisfactory, based on the image data obtained by reading the first set D1 by scanner section 16.

To begin with, a stamping process carried out at the time of creating the first set D1 is explained here. The stamping process has an automatic combining mode in which a position of combining stamp is automatically identified by image forming apparatus 10, and the position designation combining mode in which the user designates the position in which the stamp is to be combined.

Meanwhile, the contents of the Bates stamp (the image itself) to be combined is set and registered in advance in an illustrated stamp registration screen. Specifically, for each stamp ID (Identification), settings (presence or absence of title character string, character codes indicating the contents of the title character string) related to the title character string indicating the name of the attorney's office, the contents of setting (presence or absence of date and time and format) related to date and time, settings (presence or absence of character string to be prefixed before the page number and character codes indicating the contents of that character string, presence or absence of print, number of digits and an initial value of page number) related to the page number, and settings related the format (number of lines, paragraphs, etc.,) of the entire Bates stamp, and to the character size and character type, are registered as the contents of the Bates stamp.

Figure 3:
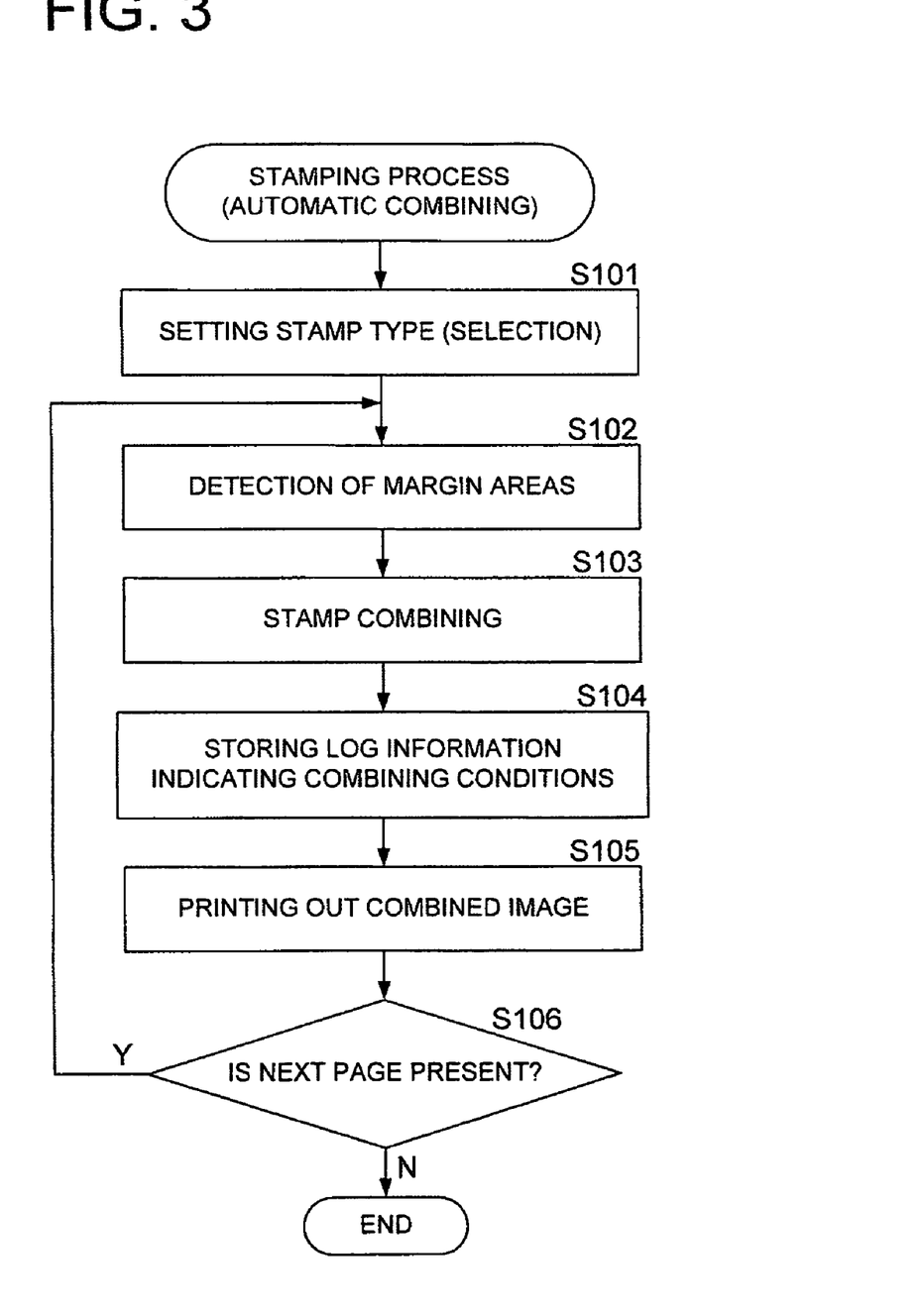
FIG. 3 is a flow chart showing the stamping process in an automatic image combining mode.

FIG. 3 shows flow of the stamping operations in the automatic combining mode. The type of stamp to be combined is selected by stamp ID among those that have been registered in advance (Step S101). Next, using the OCR (Optical Character Reader) processing, the margin areas in a page are detected (Step S102), the combining position or size (reduction factor) of the stamp is decided, and according to this decision, the image data of the stamp is combined with the image data of the original image of the page thereby creating the composite image data (Step S103). Further, the log information indicating the conditions of combining the images at the time of combining is recorded (Step S104). Printer section 18 prints out the composite image based on the created composite image data (Step S105).

If there is a next page (Y in Step S106), the steps S102 to S105 are executed for the next page, and if there is no next page (N in Step S106), the stamping processes are terminated (END).

Figure 4A:
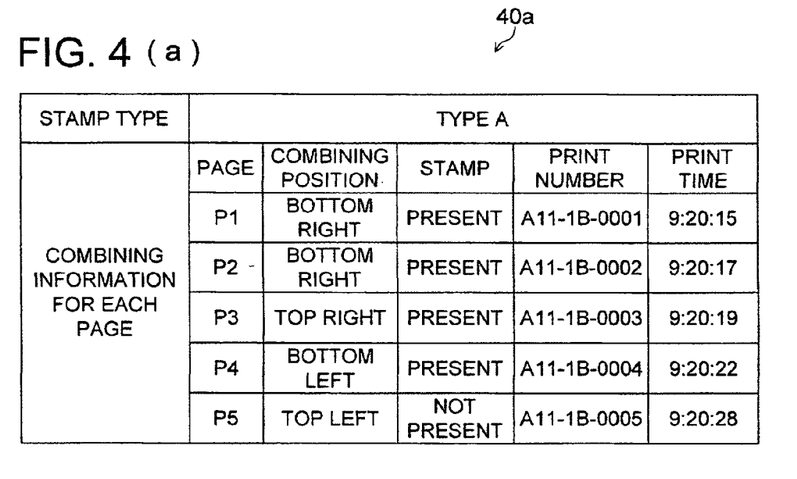
FIG. 4 is an explanatory diagram showing an example of an log information created and stored at the time of composite images.

FIG. 4(a) shows an example of log information 40a recorded at the time of combining the stamp in the automatic combining mode. Log information 40a is constructed using the stamp ID and the combining information for each page. The stamp ID is used for identifying the contents of the Bates stamp used for image combining. In other words, since the contents of the Bates stamp are registered beforehand using character codes, the contents of the stamp at the time of combining is identified by the stamp ID in the log information except the part that changes for every page such as the page number.

The combining information for each page is the information in units of a page, and is composed of a page number, a combining position, the presence or absence of stamp, the printing number, and the printing time. The combining position is indicated such as top right, bottom right, top left, bottom left, top center, bottom center, etc. More detailed combining position may be expressed. For example, the position can be specified in terms of coordinates taking the top left corner of the page as an origin.

The presence or absence of the stamp is the information indicating whether or not a stamp was combined in that page. The printing number indicates the actual contents printed out as the page number in the Bates stamp (the page number and the literal string prefixed to it).

The printing time expressed contents actually printed as time and date. The print number and the print time are log information to identify page by page the printing contents which can be changed page by page in the combined Bates stamp. Meanwhile, it is also possible to store the page by page reduction ratio of the stamp image for each page.

Figure 5:
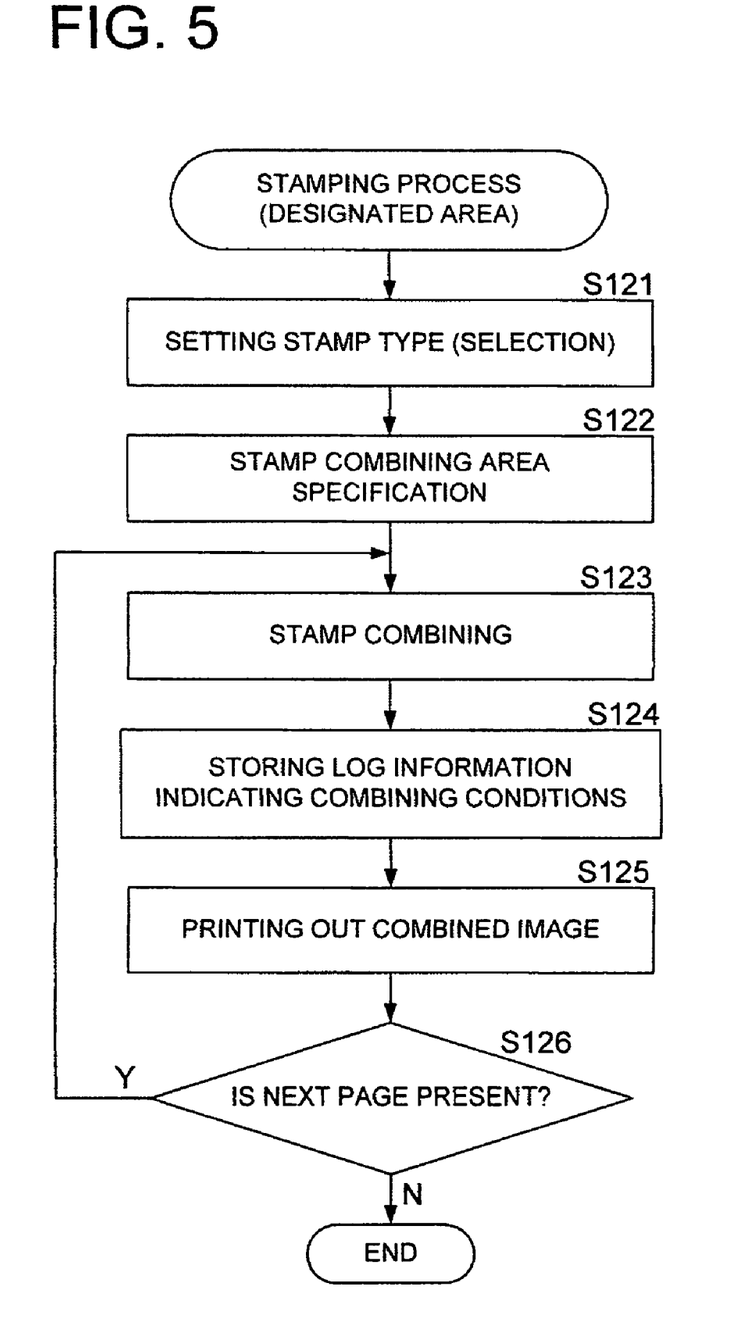
FIG. 5 is a flow chart showing a stamping process in the position designation image combining mode.

FIG. 5 shows the flow of the stamping process in the position designation combining mode. To begin with, the type of stamp is selected by using the stamp ID (Step S121). Next, the specification of the combining area is received (Step S122). The combining position is designated as top right, bottom right, top left, bottom left, top center, bottom center, etc. It is also possible to designate the combining position more specifically with a coordinate system.

Next, the composite image data is created (Step S123) by adding the image data of the Bates stamp corresponding to the selected ID to the image data of the original image in the designated combining area. In addition, the log information indicating the conditions of combining at the time of combining the images is stored (Step S124). The printer section 18 prints out the composite image based on the created composite image data (Step S125).

After that, if there is a next page (Y in Step S126), the steps S123 to S125 are executed for the next page, and if there is no next page (N in Step S126), the stamping processes are terminated (END).

Figure 4B:
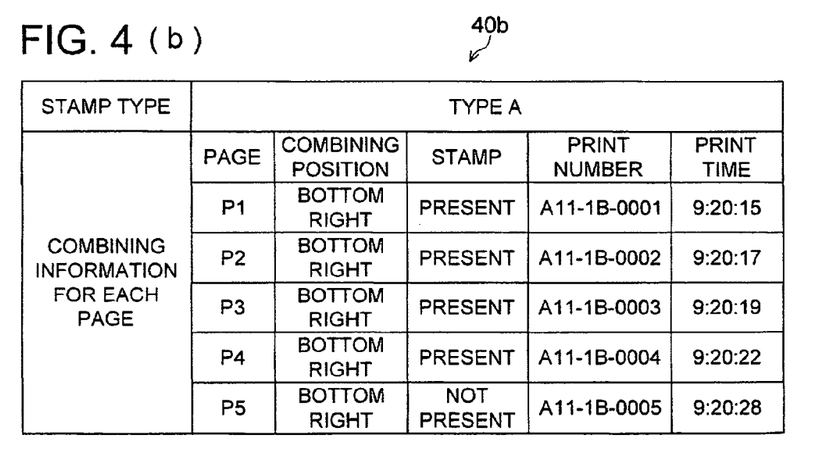
Figure 4C:
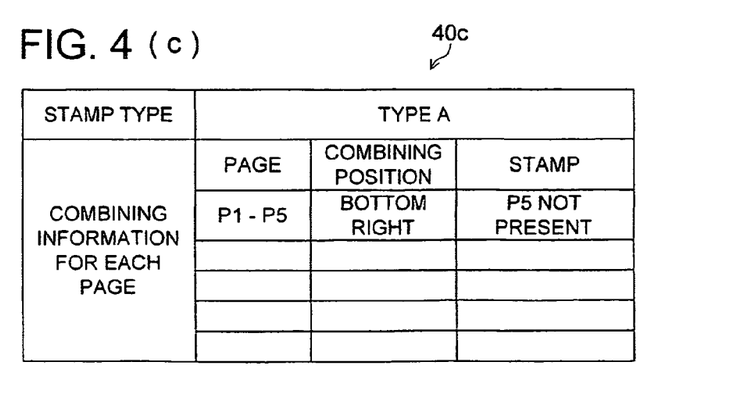

FIG. 4(b) shows an example of log information 40b recorded at the time of combining the stamp in the position designated combining mode. In this example, the case where the combining area is designated at bottom right is shown. Further, if the printing number, the printing time, etc., are not registered, it is also possible to store log information 40c in the format shown in FIG. 4(c).

Figure 6:
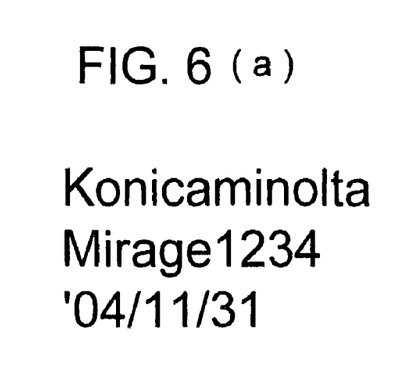
FIG. 6 is an explanatory diagram showing differences in the stamp image depending on the position of combining.

FIG. 6 shows an example of the differences in the stamp image depending on a combining position. FIG. 6(a) shows the stamp image in the cases when it is combined at the top left, center left, and bottom left positions, and the character strings in each line are printed in the left justified condition. FIG. 6(b) shows the stamp image in the cases it is combined in the top center, center, and bottom center positions, and the character strings in each line are printed in the center justified condition. FIG. 6(c) shows the stamp image in the cases it is combined at the top right, center right, and bottom right positions, and the character strings in each line are printed in the right justified condition. In this manner, by changing the justification of character strings automatically depending on the combining position, the appearance of the stamp is improved. In addition, the possibility of overlapping of the stamp image with the original image at the time of combined is reduced. Further, it is also possible to fix the justification method of the character strings fixed irrespective of the combining position.

Figure 7:
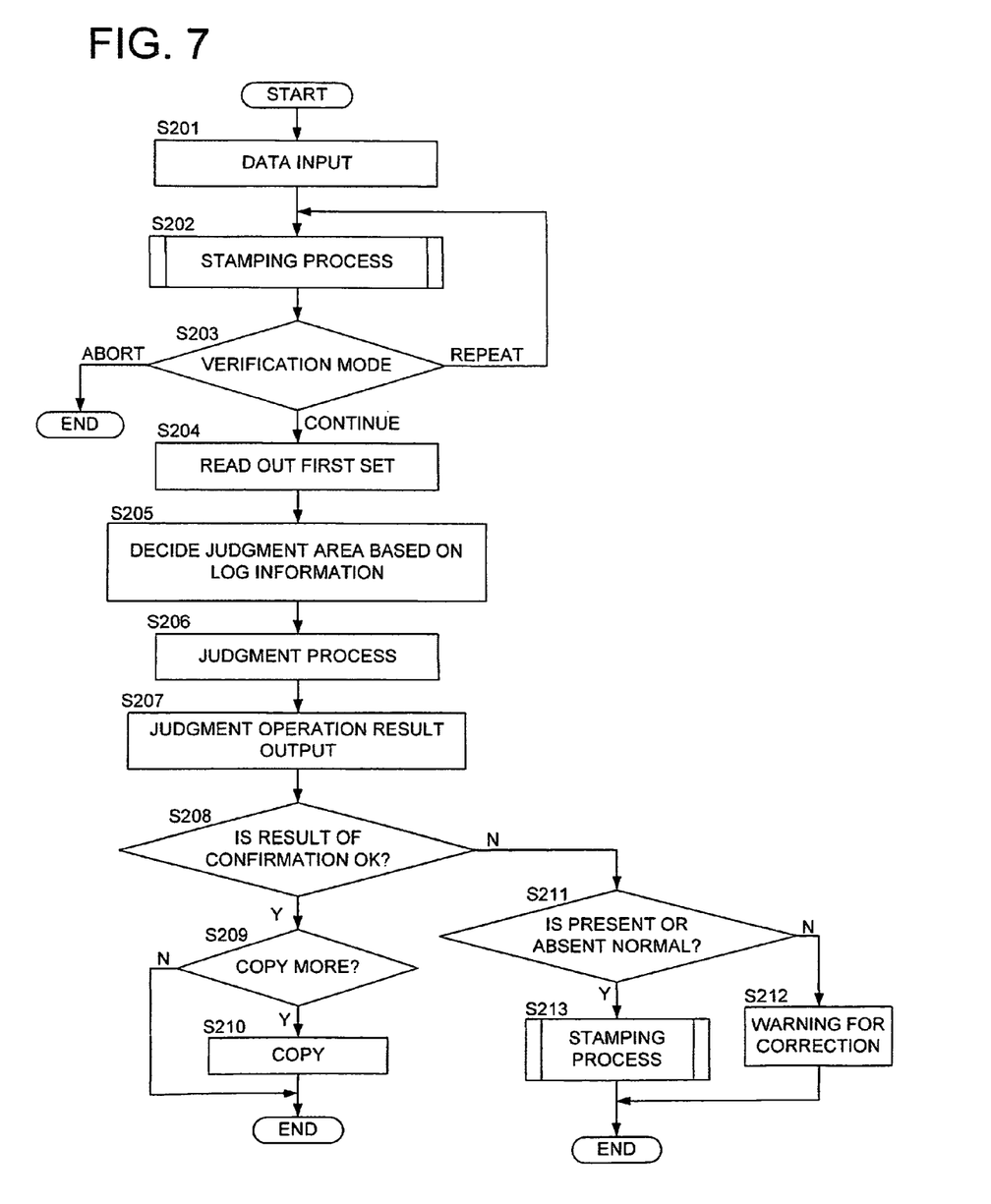
FIG. 7 is a flow chart showing the operation of adding the Bates stamp carried out by the image forming apparatus.

FIG. 7 shows the flow of the entire Bates stamp adding operations carried out by the image forming apparatus 10. In the stamp overlay selection screen 50 shown in FIG. 8, after the Bates stamp button 51 is selected, when unillustrated START button is operated, the image forming apparatus 10 carries out the processing of reading in the image data as the original image (Step S201). Apart from reading in the original document optically in scanner section 16, loading of the image data of the original image can be carried out by receiving the data from an external terminal via communication interface 14. If the original image has a plurality of pages, the image data of all pages of the document is loaded. The image data loaded is stored in non-volatile storage device 13.

When the loaded image data of the original image is completed, the stamping process is carried out (Step S202) either in the automatic combining mode shown in FIG. 3 or in the position designated combining mode shown in FIG. 5. Here, a user can verify the condition of the composite image printed out as the first set and can select the operations to be carried out thereafter. In other words, the stamping process can be carried out again (Repeat in Step S203) or the process can be aborted (Abort in Step S203). Or else, it is also possible to continue verification process of the combining condition of the Bates stamp in the first set by the apparatus (Continue in Step S203).

When the process of verification by the apparatus is selected (Continue in Step S203), image forming apparatus 10 reads each page of the first set of document where the Bates stamp is combined (Step S204) by scanner section 16, carries out image analysis of the image data obtained by scanning after identifying the judgment area (Step S205) based on the log information 40, and judges the condition of combining the Bates stamp in each page of the first set of the document (Step S206). Next, the judgment result is notified in accordance with the set notification conditions (Step S207).

During the judgment process, the subject area of judgment is restricted based on the position of combining indicated by log information 40, and the condition of the Bates stamp within the area is judged. For example, if the combining position indicated by the log information of the page is top right, image analysis is carried out for a designated area at the top right part of the page as the subject area, and thereby, the processing volume of judgment is reduced and the speed increases.

Further, the contents of the combined Bates stamp is identified from the stamp ID, printing number, and printing time indicated by log information 40, and condition of overlapping between the Bates stamp and the original image (the positional relationship between the Bates stamp and the original image) is judged. In this way, it is possible to judge accurately the presence or absence of overlapping, and the state of overlapping.

For example, if the Bates stamp and the original image are overlapping, even if the character at that position of overlapping is recognized normal by OCR process (recognized as a different character due to overlapping), if the character is not included in the contents of the Bates stamp indicated by the log information, or if the arranging order of the characters is different from the character string in the Bates stamp indicated by the log information, it is possible to judge that there is some abnormality such as overlapping in the condition of the Bates stamp in the composite image. In addition, if the character size, font, and format included in the log information is included in the judgment criteria, it is possible to judge the condition of the Bates stamp in the composite image with a higher accuracy.

The status of the composite image is judged in three stages i.e. "Good", "Unknown", and "Bad". "Good" means that there is certainly no overlapping, "Unknown" means that the stamp is likely (suspected) to overlap with the image data, for example, when it is likely that the stamp is not affixed properly—(1) that is, the stamp is close to non image printing area (edge erased area), or there is a possibility that the stamp overlaps with the edge erased area.

In addition, (2) when the printing is carried out after acquiring an area by carrying out "trash removal processing" at the time of judging the stamping area, the judgment result will be "Unknown" since it can be considered that the trash removal processing is not carried out correctly. Further, if it is certain that there are some overlaps, the judgment result is "Bad". In addition, a judgment is also made as to whether or not the Bates stamp actually exists (presence or absence) in the combining position indicated by the log information.

Figure 9A:
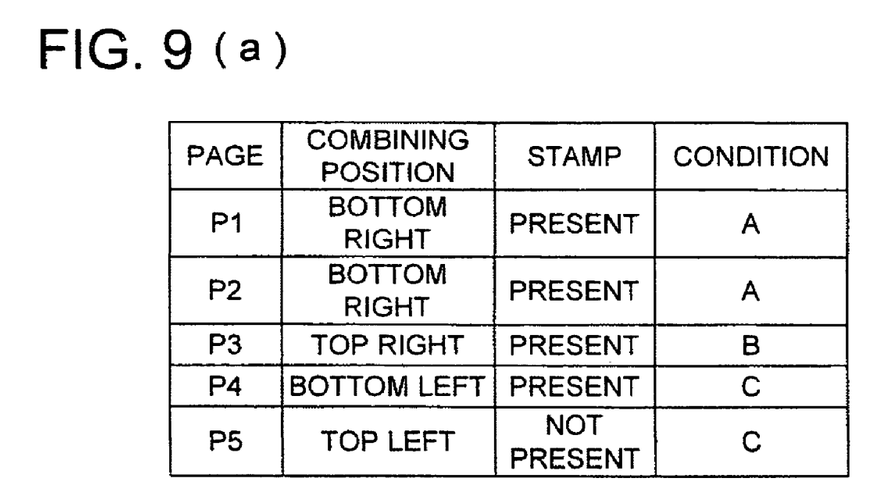
FIG. 9 is an explanatory diagram showing an example of notification of the judgment result.
Figure 9B:
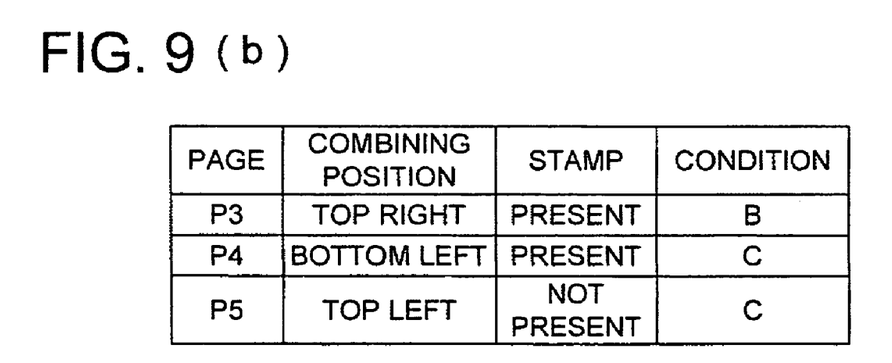

FIG. 9 shows an example of notification of the judgment result. The stamp combining position, the presence or absence of the stamp, and the condition of the combining are corresponded to the pages numbers to be notified. The notification can also be made by printing out in printer section 18 in addition to displaying in the operation display section 15. The contents of the notification can be changed by changing setting through the notification condition setting section. FIG. 9(a) shows an example of notification when the notification condition is set so that the judgment result is notified for all the pages, and FIG. 9(b) is an example of notification when the notification condition is set so that the judgment result is notified only for the pages which are judged to be "Unknown" or "Bad" and the judgment result is not notified for the "Good" pages.

Meanwhile, the judgment result "Good" is indicated by the mark "A", "Unknown" by "B", and "Bad" by "C". Meanwhile, the condition will be judged as "Bad" if the detected condition of the stamp is different from the log information, for example, in case no stamp exists in the combining position indicated by the log information, and in case that the stamp is present in a position at which there is no combining of image in the log information.

Figure 8:
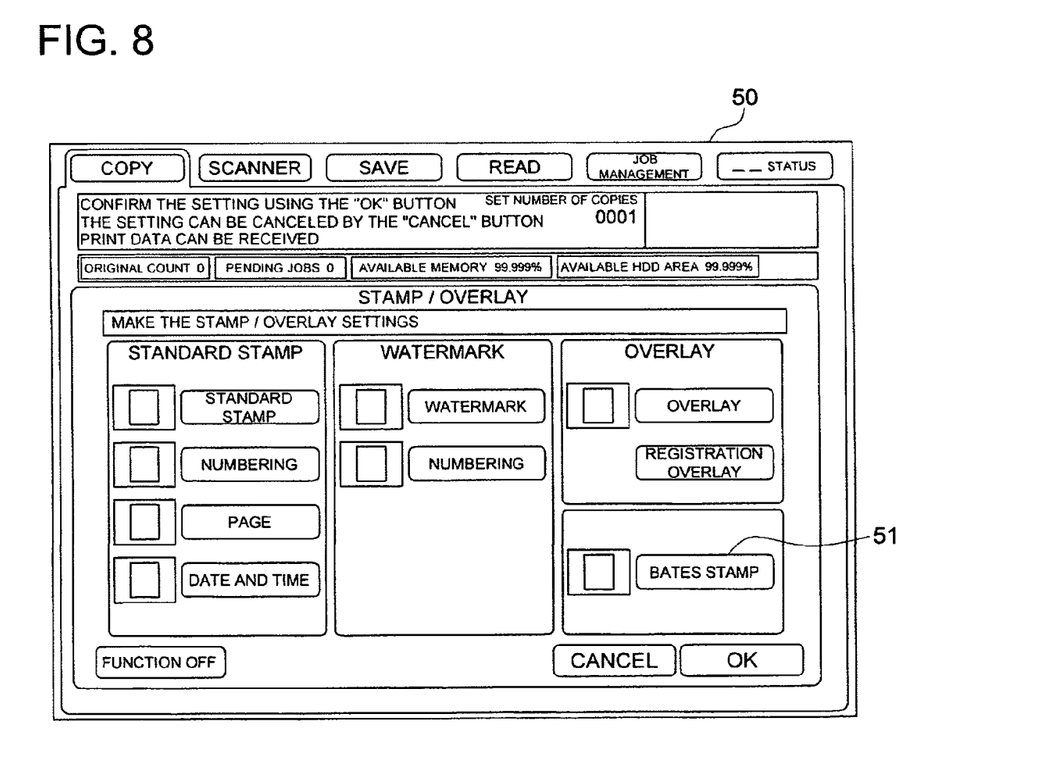
FIG. 8 is a front view of an example of the stamp overlay selection screen displayed in the operation display section of the image forming apparatus.

The embodiment of notification is not restricted to that shown in FIG. 8. According to the result of judgment, the color of the characters, i.e. background color, character size, can be changed. For example, the color of the characters can be black for "Good", blue for "Unknown", and red for "Bad".

In this manner, since the condition of combining the stamp is judged automatically and that judgment result is notified, the user has only to visually verify only pages for which the judgment result is "Unknown" or "Bad", thus the work-load of carrying out visual verification is reduced. In addition, by notifying the judgment result only for the "Unknown" or "Bad" pages, and by changing the mode of notification depending on the judgment result, it is possible to quickly recognize which page has to be verified visually, and the workload of the user is reduced further.

Figure 10:
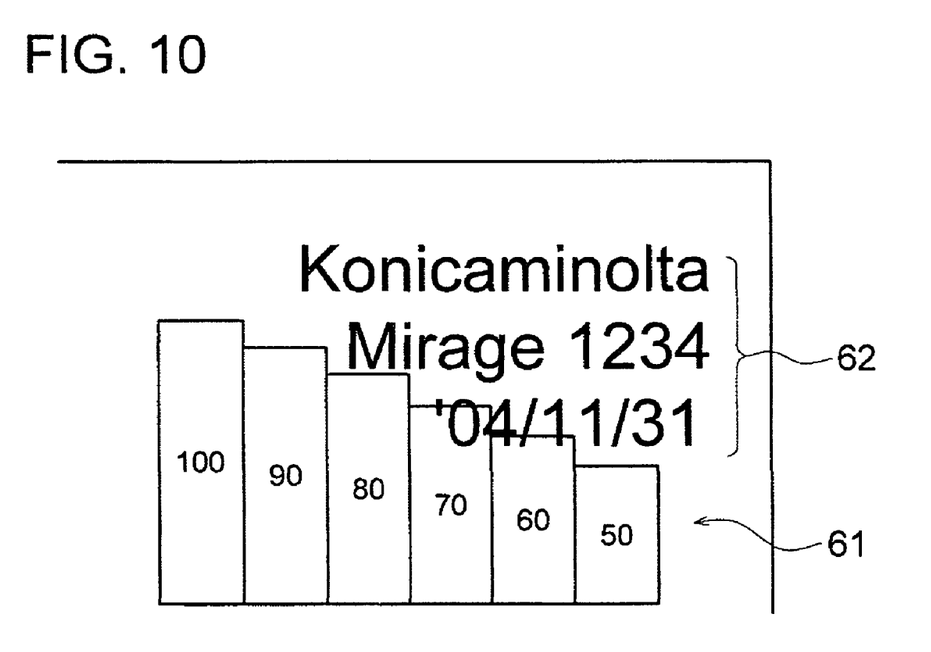
FIG. 10 is an explanatory diagram showing an example of a "defect" in which the original image and the Bates stamp are overlapping each other.

FIG. 10 shows an example of "Bad" in which original image 61 and Bates stamp 62 are overlapping each other.

Returning to FIG. 7, the explanations are continued here. The user checks the notified judgment result (Step S208), and if there is no problem in the condition of combining the stamp (Y in Step S208), the user selects whether or not copying of the second and third sets (Step S209) is carried out. If the execution of copying is selected (Y in Step S209), image forming apparatus 10 prints out the second and third sets of copies of the document (Step S210) based on the image data of the first set that is read out by scanner section 16 and stored in non-volatile storage device 13, and then terminates the processes (END).

If the execution of copying is not selected (N in Step S209), the processes are terminated (END) without printing out the second and the third sets of the document. For example, as a result of the visual inspection, if the contents or the combining position of the stamp is to be corrected, the process advance to carrying out to add the Bates stamp again without selecting the execution of copying the second and third sets of documents As a result of verifying the notified judgment result, if there is a problem in the condition of combining the stamp (N in Step S208), a judgment is made as to whether the problem is related to the presence or absence of the stamp or to the position of combining being different from the log information (Step S211), if there is any difference (N is Step S211), it is judged that either a page is missing or pages are exchanged, a warning is given to correct the situation (Step S212), and the operations are terminated (END).

If the presence or absence of the stamp matches with the log information (Y in Step S211), the stamping process after correcting the combining position is executed again (Step S213) so that the problem related to the condition of combining the stamp is solved, and the processes are terminated (END).

In the above, the preferred embodiment of the present invention has been described with reference to the drawings, the concrete configuration shall not be construed to be limited to that given in the preferred embodiment, and any changes or additions within the scope and intent of the present invention shall be included in the present invention.

For example, the additional image need not be restricted to a Bates stamp. In addition, while the condition of overlapping of the original image and the additional image is judged, it is also possible to judge additionally scraping of the additional image, etc.

Further, the conditions of notification need not be restricted to the conditions for narrowing down the pages that are the subject of the notification as shown by the example in the preferred embodiment, however, for example, a condition as to notification items such as whether or not the printing time is added to the notification items may be selective.

Further, the log information storing the conditions of combining at the time of composite images is not restricted to the examples shown in the preferred embodiment, and may store only the position of combining, or only the contents of combining. Further, the recording format of the information indicating the position of combining or the contents of combining is not restricted to the example shown in the preferred embodiment. In addition, the judgment result for each page may be retained as the log information.

For example, in the preferred embodiment, while the contents of the stamp is recognized by the registered contents (character code) of the stamp corresponding to the stamp ID, it is also possible to store the contents of the actually combined stamp image as a bit map data. In this case, it is possible to judge the condition of combining the stamp by comparing the bit map data stored as the log information with the image data obtained by reading the composite image of the first set of documents. In concrete terms, there are methods to judge the overlapping where the areas of contiguous black pixels are extracted respectively from the bit map data of the log information and from the read out image data, and the shapes of the areas of contiguous black pixels are compared.

Apart from this, while the example of an multi-function peripheral has been explained in this preferred embodiment, it can be an apparatus having a scanner section and a printing section or a simple copying machine.

Further, in the preferred embodiment described above, an example is described in which the composite image data is prepared by combining the additional image data with the original image data, and after printing out the composite image based on the composite image data through image forming apparatus 10, the composite image data is obtained by reading the composite image through image forming apparatus 10. Further, the embodiment was described in which the condition of the additional image indicated by the additional image data in the composite image is judged based on the log information indicating the combining conditions at the time of creation of the composite image data and the composite image data.

However, the present invention can also be applied to other embodiment. For example, image forming apparatus 10 obtains an composite image data by reading out an composite image which is printed out by another image forming apparatus, and an condition of an additional image indicated by additional image data in the composite image can be judged based on log information indicates an combining condition at the time of creating the aforesaid composite image data and the composite image data. Or image forming apparatus 10 obtains an composite image data by reading out an composite image which has an original image and an additional image manually added to the original image, and an condition of an additional image indicated by additional image data in the composite image can be judged based on log information indicates combining condition at the time of creating the aforesaid composite image data and the composite image data.

In addition, the present invention can also be applicable to the embodiment in which the composite image data is created by adding an additional image data from a personal computer connected to the image forming apparatus 10. In this case, the image data, the additional image data to be added to the image data, and the log information indicating the combining conditions at the time of creating the composite image data are obtained by an information acquisition section provided in the image forming apparatus 10, and, the condition of the additional image indicated by the additional image data in the composite image indicated by the composite image data is judged based on the image data, the additional image data, and the log information obtained by the information acquisition section.

According to the preferred embodiment of the present invention, the image forming apparatus has a combining section to combine original image data and additional image data and to create the composite image data, a storage section to store the log information indicating the combining condition when the composite image data is created in the combining section, a printing section to print the composite image based on the composite image data, a reading section to read out the composite image printed by the printing section and to obtain the composite image data, a judgment section to judge the condition of the additional image indicated by the additional image data in the composite image based on the log information stored in the log information stored in the storage section and on the composite image data obtained by reading the composite image through the reading section, and a notification section to notify the judgment result of the judgment section.

In the above embodiment, the combining conditions at the time of combining the images, for example, the position of adding the additional image to the image data, the contents of the additional image, size of image or text characters, font, format, etc., are stored as a log information, and the condition of the additional image in the composite image is judged by checking the image data obtained by reading out the actually composite image based on the log information stored when combining the images.

According to another aspect of the preferred embodiment of the present invention, the image forming apparatus has a reading section to obtain the composite image data by reading out the composite image having an image and an additional image added to the image, a judgment section to judge the condition of the additional image in the composite image based on the log information indicating the combining conditions at the time of creating the composite image and on the composite image data, and a notification section to notify the judgment result of the judgment section.

According to the preferred embodiment of the present invention, the image forming apparatus with the feature having an information obtaining section to acquire the image data, the additional image data added to the image data, and the log information indicating the combining conditions when the composite image data is created by adding the additional image data to the image data, a judgment section to judge the condition of the additional image data indicated by the additional image data in the composite image data indicated by the composite image based on the image data, the additional image data, and the log information, and a notification section to notify the judgment result of the judgment section.

According to the preferred embodiment of the present invention, the image forming apparatus has a notification condition setting section to set the notification conditions, wherein the notification section notifies the judgment result only for the pages where the judgment result by the judgment section matches with the notification conditions set by the notification conditions setting section.

According to the above embodiment, the judgment result is notified to only the pages where the judgment result matches with the set notification conditions. As the notification conditions, for example, all pages, defective pages, defective pages and pages suspected to be defective, pages without any defects are considered.

According to the preferred embodiment of the present invention, the image forming apparatus has the judgment section to judge the state of overlapping of the image and the additional image.

In the above embodiment, the presence or absence of overlapping between the additional image and the original image, and an extent of overlapping. Overlapping may also include contacting.

According to the preferred embodiment of the present invention, the image forming apparatus has the notification section to notify the result of judgment of pages in which the additional image and the image are overlapping each other and of pages in which overlapping of the additional image and the image are suspected, and not to notify the judgment result of pages in which the additional image and the image do not overlap each other.

According to the above embodiment, since the judgment result is notified only for the pages that need to be verified visually, the efficiency of visual verification is improved.

According to the preferred embodiment of the present invention, the image forming apparatus has the log information including an image combining position information of the additional image.

According to the preferred embodiment of the present invention, the image forming apparatus has the judgment section to identify the subject area of judgment in the composite image data based on the image combining position information.

In the above embodiment, since the judgment of the condition of the additional image is made in the area indicated by the image combining position information among the image data read out, an amount of processing of judgment is reduced and the judgment becomes speedier.

According to the preferred embodiment of the present invention, the image forming apparatus has the log information stored in the storage section to include the contents of the additional image.

According to the preferred embodiment of the present invention, the image forming apparatus has storage section to store the contents of the additional image in character codes, and the judgment section judges the positional relationship of the image and the additional image in the composite image based on the contents of the additional image indicated by the character code string stored in the storage section and on the composite image data.

In the above embodiment, the contents of the additional image is stored as character codes during combining the images, the character string indicating the character codes is identified in the image data obtained by reading out the composite image, and the state how the character string is combined is judged. For example, even if a character of the additional image and a character of the original image are overlapping each other and the characters are recognized as one normal character that is different from an original character, it is possible to judge an abnormality such as overlapping if the character is not found in the character codes recorded when combining the images.

According to the preferred embodiment of the present invention, the image forming apparatus has the storage section stores the contents of the additional image in a form of bit map data as the log information, and the judgment section judges the positional relationship of the image and the additional image in the composite image based on the contents of the additional image indicated by the bit map data stored in the storage section as the log information and on the composite image data.

In the above embodiment, the condition of the additional image in the composite image is judged by carrying out pattern matching between the bit map data stored in the storage section and the image data obtained by reading the composite image.

According to the preferred embodiment of the present invention, since log information indicating the condition of combining the images at the time of combining the additional image and the original image is stored, the condition of the additional image in the composition image is judged based on the log information and image data obtained by reading the composite image, and since the result of this judgment is notified, it is possible to pick up pages in which the additional image and the original image are overlapping and pages in which they are suspected to be overlapping is suspected based on the judgment result, the number of pages that need to be verified visually is reduced, and the workload of carrying out visual inspection can be made lighter.

What is claimed is:

1. An image forming apparatus for processing a plurality of pages having respective original images, comprising:
    a combining section to create, for each of the plurality of pages, a composite image by combining data of the corresponding original image with data of an additional image such that the additional image is added to the corresponding original image;
    a log management section to store log information indicative of, for each of the plurality of pages, a combining area of the additional image in the corresponding original image, wherein the log information is created when the composite images are created;
    a printing section to print the composite images on a plurality of recording sheets respectively;
    a scanning section to scan the composite images printed on the plurality of recording sheets by the printing section, and obtain composite image data of the composite images;
    a judgment section to judge, for each of the plurality of recording sheets, whether the respective additional image is overlapped with the respective original image in the respective composite image based on the stored log information and the composite image data obtained by the scanning section;
    a notification section to notify a judgment result obtained by the judgment section, wherein the notification section notifies the judgment result of those recording sheets of the plurality of recording sheets in which the original image and the additional image overlap each other; and
    a control section to control the combining section, the printing section, and the scanning section to operate in sequence so that the scanning section operates after the combining section and the printing section.

2. The image forming apparatus of claim 1, further comprising:

a notification condition setting section to set a notification condition, wherein the notification section notifies the judgment result of only those recording sheets of the plurality of recording sheets whose judgment result by the judgment section meets the notification condition set by the notification condition setting section.

3. The image forming apparatus of claim 1, wherein the notification section further notifies the judgment result of a recording sheet of the plurality of recording sheets in which it is suspected that the original image and the additional image overlap each other, and the notification section does not notify the judgment result of a recording sheet of the plurality of recording sheets in which the original image and the additional image do not overlap each other.

4. The image forming apparatus of claim 1, wherein the judgment section specifies an object area for judgement in each composite image based on the combining area of each additional image in the corresponding original image.

5. The image forming apparatus of claim 1, wherein the log information includes contents of each additional image.

6. The image forming apparatus of claim 5, wherein the log information indicates the contents of each additional image represented by a character code.

7. The image forming apparatus of claim 5, wherein the log information indicates the contents of each additional image by bit map data.

8. The image forming apparatus of claim 6, wherein the judgment section judges a positional relation of each additional image in the corresponding composite image.

* * * * *